(12) United States Patent
Blair et al.

(10) Patent No.: US 8,419,284 B2
(45) Date of Patent: Apr. 16, 2013

(54) HYDRAULIC END FLOAT ADJUSTER

(75) Inventors: Barry J. Blair, Oconomowoc, WI (US); Donald S. Pitsch, Sheboygan, WI (US)

(73) Assignee: Waukesha Bearings Corporation, Pewaukee, WI (US)

( * ) Notice: Subject to any disclaimer, the term of this patent is extended or adjusted under 35 U.S.C. 154(b) by 450 days.

(21) Appl. No.: 12/455,333

(22) Filed: Jun. 1, 2009

(65) Prior Publication Data
US 2010/0303392 A1  Dec. 2, 2010

(51) Int. Cl.
*F16C 32/06* (2006.01)

(52) U.S. Cl.
USPC ............................................ 384/121; 384/122

(58) Field of Classification Search .................. 384/121, 384/122, 123, 124
See application file for complete search history.

(56) References Cited

U.S. PATENT DOCUMENTS

| | | | |
|---|---|---|---|
| 2,158,345 A | 11/1938 | Weiss | |
| 2,507,021 A | 5/1950 | Lakey | |
| 3,062,598 A | 11/1962 | Summers | |
| 3,137,530 A | 6/1964 | Kohler | |
| 3,453,032 A | 7/1969 | Oberle | |
| 3,652,139 A | 3/1972 | Memery | |
| 4,073,549 A | 2/1978 | Christ et al. | |
| 4,106,824 A * | 8/1978 | Meystre et al. | 384/122 |
| 4,239,300 A * | 12/1980 | Adler | 384/120 |
| 4,310,204 A * | 1/1982 | Christ et al. | 384/106 |
| 4,749,282 A * | 6/1988 | Spargo et al. | 384/10 |
| 5,613,781 A | 3/1997 | Kuzdzal et al. | |
| 5,791,786 A | 8/1998 | Stahlecker | |
| 6,746,152 B2 * | 6/2004 | Branagan | 384/122 |
| 7,063,465 B1 | 6/2006 | Wilkes et al. | |

FOREIGN PATENT DOCUMENTS

DE  2357881  5/1975

OTHER PUBLICATIONS

European Search Report; 10251014.6-2424, Aug. 9, 2010.
European Office Action dated Jan. 26, 2011 regarding European Patent Appln. No. 10251014.6, 2 pages.

* cited by examiner

*Primary Examiner* — Phillip A Johnson
(74) *Attorney, Agent, or Firm* — Ryan Kromholz & Manion, S.C.

(57) ABSTRACT

A bearing system for reducing end clearance and axial vibrations includes a bearing housing and a bearing. The bearing is a thrust bearing and may be of any type, such as a flat thrust face, a taper land thrust bearing or a tilt pad thrust bearing. The bearing housing includes a cavity to hold the bearing. A fluid cavity is formed between the bearing and the bearing housing. At least one fluid passageway extends through the bearing housing to feed fluid to the fluid cavity. As fluid is introduced to the fluid cavity the pressure in the cavity moves the bearing outward, away from the bearing housing and towards the rotating thrust collar, reducing the clearance, or space, between the face of the bearing and the thrust collar, reducing or eliminating the vibrations.

15 Claims, 7 Drawing Sheets

HYDRAULIC END FLOAT ADJUSTER

BACKGROUND OF THE INVENTION

A thrust bearing is a type of bearing which allows for rotation between parts while supporting an axial load. Fluid film bearings are a type of thrust bearing wherein the bearing's loads are supported on a thin fluid layer or film of liquid or gas which is formed between the bearing surfaces in relative motion. Fluid bearings are often used in many applications covering a wide range of loads and speeds.

Flat land thrust bearings, taper thrust bearings (with or without a land), and tilt pad thrust bearings are three types of fluid film thrust bearings. A flat land thrust bearing utilizes a flat plate or washer, often with radial grooves, to carry the axial load. Taper land thrust bearings utilize plates similar to a flat land thrust bearing but with multiple profiles (taper lands, as one example) machined into the bearing surface. Tilt pad thrust bearings utilize a number of individual segments (or pads), each of which is configured to pivot or tilt to adjust to form a nearly optimal fluid wedge that supports high loads over widely varying speeds in either direction and with a variety of lubricants. In some applications, leveling links are located behind the pivots to accommodate minor misalignment and equalize loads on each of the pads.

Thrust bearings are utilized with a rotating shaft, which includes a thrust collar, runner or block. The distance that a shaft can travel between two thrust bearings is called the end clearance or axial clearance.

Generally, the end clearance is set by the user when assembling the system. The size of the clearance can affect the performance of a system. Specifically, a relatively large clearance may allow for vibrations to occur within the system. For this reason, users need to be very aware of the installation of the bearing and the tolerance of the system.

It is therefore desirable to provide a bearing which is able to account for variation in the end clearance to reduce the need for tight tolerances in a system set up and to reduce clearance to prevent the occurrence of vibrations.

SUMMARY OF THE INVENTION

The invention provides systems and methods for reducing end clearance and preventing vibration in a bearing system.

One aspect of the invention provides a thrust bearing system including a stationary bearing housing, a movable bearing at least partially disposed within the bearing housing and being movable between a first retracted position and a second extended position, a fluid cavity formed between the bearing housing and the bearing retainer, and at least one fluid passageway extending through the stationary bearing housing, the fluid passageway having a first end at the exterior surface of the bearing housing and a second end in fluid communication with the fluid cavity.

The thrust bearing system may include at least one bearing surface.

The bearing surface of the thrust bearing system may be a flat thrust face.

The bearing surface of the thrust bearing system may be a taper land thrust bearing.

The bearing surface of the thrust bearing system may be at least one tilt pad thrust face.

The thrust bearing system may include at least one bearing retainer coupled to the bearing housing, the retainer being sized and configured to limit the motion of the bearing relative to the bearing housing.

The thrust bearing system may include at least one sealing element disposed between the movable bearing and the bearing housing.

The at least one sealing element of the thrust bearing system may be an o-ring.

The thrust bearing system may include at least one second fluid passageway extending through the bearing, the second fluid passageway having a first end at the fluid cavity and a second end near the bearing surface.

Another aspect of the invention provides a method for reducing end clearance in a bearing system including providing a bearing housing having a fluid bearing cavity formed therein and at least one fluid passageway, providing a bearing sized and configured to sit at least partially within the bearing housing with a fluid cavity being formed between the outside surface of the bearing and the inside surface of the bearing housing and the fluid cavity being in fluid communication with the fluid passageway, and moving the bearing away from the bearing housing.

The fluid passageway of the method may have a first end at the exterior surface of the bearing housing and a second end at the interior surface of the bearing housing adjacent the fluid cavity.

The moving step of the method may include supplying oil to the first end of the fluid passageway.

The method may include lubricating the bearing.

The lubricating step of the method may include providing at least one lubrication passageway within the bearing, the lubrication passageway being in fluid communication with the fluid cavity.

The lubrication passageway of the method may have a first end at the fluid cavity and a second end at a bearing surface.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

The illustrated embodiments bearing systems 10,110,210, 310 shown in FIGS. 1 through 10 each comprise a bearing housing 12,112,212,312 and a bearing 14,114,214,314. The bearing 14,114,214,314 is preferably a thrust bearing and may be of any type known in the art including, but not limited to a flat thrust face, a taper land thrust bearing or a tilt pad thrust bearing. The bearing 14,114,214,314 is preferably retained at least partially within the bearing housing 12,112, 212,312. Preferably at least one fluid cavity 44,144,244,344 is formed between the bearing 14,114,214,314 and the bearing housing 12,112,212,312. Preferably at least one fluid passageway 42,142,242,342 extends through the bearing housing 12,112,212,312 and feeds fluid to the fluid cavity 44,144,244,344.

In use, fluid is introduced to the fluid cavity 44,144,244, 344. When the cavity 44,144,244,344 is filled, the pressure in the cavity 44,144,244,344 moves the bearing 14,114,214,314 outward, away from the bearing housing 12,112,212,312 and towards the rotor which will generally comprise a thrust collar, which is a part of the rotating shaft. In this manner, the clearance, or space, between the face of the bearing 14,114, 214,314 and the thrust collar is reduced.

In the present invention, the distance the bearing 14,114, 214,314 moves is very small. However, it should be understood that even a relatively small change in clearance can reduce or eliminate vibrations along the axis of the shaft. The invention embodied herein overcomes this issue by hydraulically reducing the gap between the bearing and collar. When a load is applied to the thrust collar (for example through use), the thrust collar will overcome the hydraulic load from the bearing system 10,110,210,310 and force the bearing 14,114, 214,314 back towards the bearing housing 12,112,212,312 until it seats fully against the bearing housing 12,112,212, 312.

If desired, seals 52,152,252,352 may be placed between the bearing housing 12,112,212,3212 and the bearing 14,114, 214,314 to seal the fluid cavity 44,144,244,344. If clearances are sufficiently small, seals may not be required, providing sufficient pressure is retained in the fluid cavity to reduce the clearance between the bearing and the rotor. If desired additional fluid passageways 68,168,268,368 may be provided within the bearing housing 12,112,212,312 and/or the bearing 14,114,214,314 to provide lubricating fluid to the bearing. In this manner the bearing system 10,110,210,310 may both reduce end clearance between the bearing face 18,118,218, 318 and the rotor and lubricate the bearing 14,114,214,314.

It is contemplated that physical stops may be employed to restrict the amount of travel that the bearing 14,114,214,314 can move towards the thrust collar. Such physical stops may include, but are not limited to shoulder screws, ring, fastened tabs, keys. It is further contemplated that no physical stops can be used and the movement of the bearing 14,114,214,314 may be restricted solely by the thrust collar.

It is contemplated that the amount of fluid that will be required to fill the hydrodynamic film will be reduced, which will provide better dynamic performance of film. Further, the fluid supply pressure through the thrust beatings will impart a load on the shaft, preloading the rotor bearing, which has been shown to reduce lateral vibrations in journal bearings.

It is contemplated that the bearing system 10,110,210,310 will be able to adjust to set the axial end float of the machine it is utilized on, which will increase the allowable tolerance on the axial end float. In other words, the customer will not have to be as particular when setting the end clearance when using the bearing system 10,110,210,310 as described herein.

FIGS. 1 through 4 and FIG. 11 show an illustrated embodiment of a hydraulically adjusted bearing system 10. The bearing system 10 may include a bearing housing 12 and bearing 14. The bearing 14 preferably includes a tilt pad thrust bearing retainer 16 and at least two thrust tilt pads 18.

Figure 1:
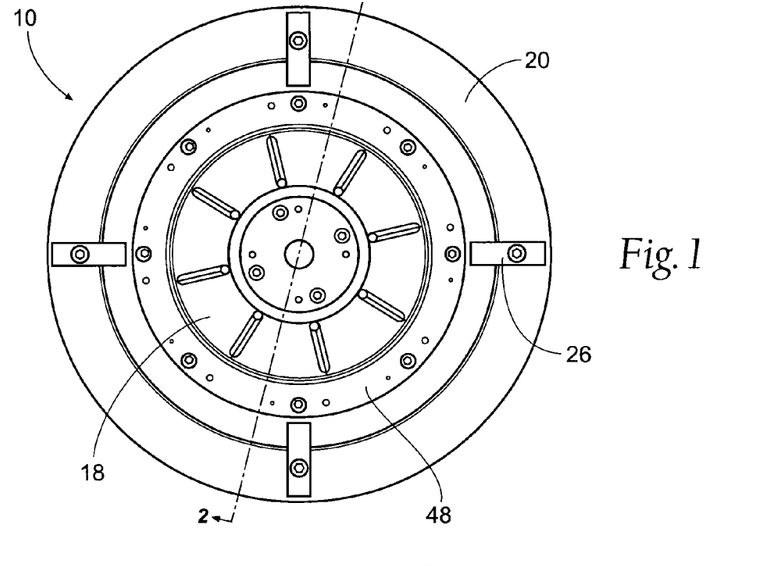
FIG. 1 is a front plan view of an embodiment of a bearing system according to the present invention.

Optionally, if desired, the bearing system 10 may further include a outer housing 20 as shown in FIG. 1. It is contemplated that the outer housing 20, if utilized, may be integrally formed to the bearing housing 12, or may be separately formed as shown in FIG. 1. The bearing system 10 may further include an outer housing spacer 22 as shown in FIG. 1. It is contemplated that the outer housing spacer 22, if utilized, may be integrally formed to the outer housing 20, or may be separately formed as shown in FIG. 1.

The outer housing 20 includes a generally cylindrical cavity 24. The bearing housing 12 preferably fits within the generally cylindrical cavity 24. The bearing housing 12 may be retained within the outer housing cavity 24 by at least one piston lock 26. The outer housing 20 may include an annular recess 28 formed on an inner surface. The bearing housing 12 may include an annular projection 30 formed on the rear surface therefore. The annular projection 30 of the bearing housing 12 is preferably sized and configured for mating with the annular recess 28 of the outer housing 20.

Figure 2:
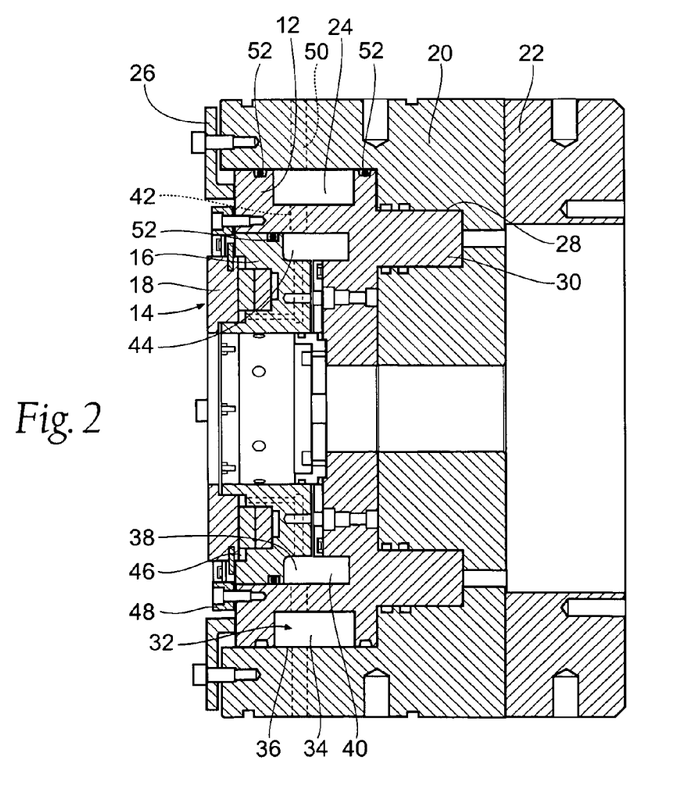
FIG. 2 is a sectional view taken along line 2-2 of FIG. 1.
Figure 3:
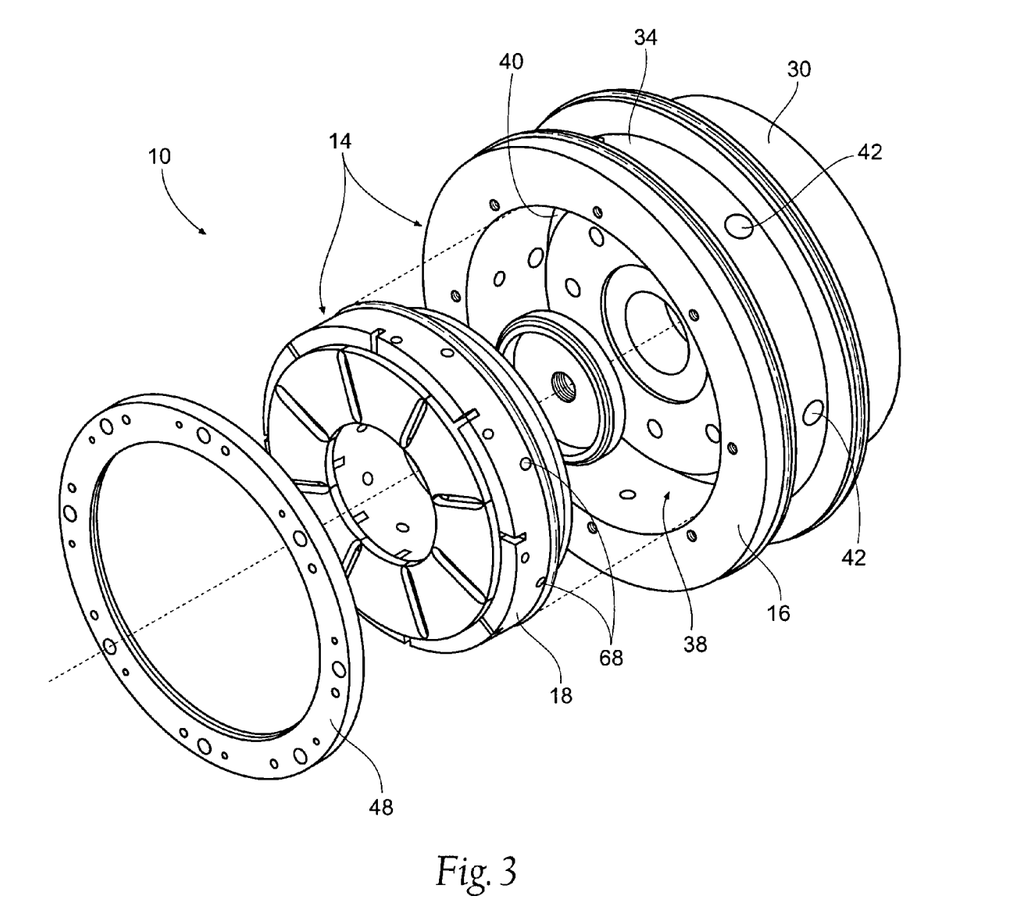
FIG. 3 is an exploded perspective view of a portion of the bearing system of FIG. 1.

The bearing housing 12 preferably includes a recess 32 formed in the outer surface of the generally cylindrical sidewall. As shown in FIG. 2A, when the bearing housing 12 is placed in the outer housing 20, a first fluid cavity 34 is defined between the recess 32 and the interior surface 36 of the outer housing 20. The bearing housing 12 preferably includes a generally cylindrical cavity 38. Preferably, the bearing housing 12 includes an annular recess 40 formed on an inner surface of the cylindrical cavity 38. As seen in FIG. 2, the sidewall of the bearing housing 12 preferably includes at least one fluid passageway 42 therethrough. The at least one fluid passageway 42 is sized and configured to allow fluid to pass therethrough.

A bearing 14 is preferably located in the bearing housing 12. The bearing 14 includes a tilt pad thrust retainer 16 which is preferably sized and configured to be seated at least partially within the bearing housing cavity 38. As shown in FIG. 2A, a second fluid cavity 44 is defined between the exterior surface of the tilt pad thrust retainer 16 and the interior surfaces of the bearing housing 12. It is contemplated that additional oil passages 45, which may include but are not limited to slots, grooves, or channels, may be employed to provide paths for supply oil and pressure to be present between the bearing retainer 16 and the housing 12 even when the bearing is under load and in direct contact with the housing.

The tilt pad thrust retainer 16 carries the tilt pad thrust pads 18. The tilt pad thrust retainer 16 preferably includes an annular recess 46. The tilt pad thrust pads 18 preferably sit at least partially within the annular recess 46. If desired, the bearing system 10 may include an axial bearing retainer 48. In the illustrated embodiment the axial bearing retainer 48 takes the form of a retaining ring. However, it is contemplated that the bearing system 10 could utilize any form of axial bearing retainer 48 known in the art, including, but not limited to shoulder screws or tabs. It is also contemplated that the bearing system 10 could be provided with no axial bearing retainer 48.

As seen in FIG. 1, the outer housing 20 preferably includes a fluid passageway 50. Fluid passes through the fluid passageway 50 and into the first fluid cavity 34. The bearing housing 12 preferably includes means for sealing 52 the first fluid cavity 34. In the illustrated embodiment, the means for sealing 52 the first fluid cavity 34 are a pair of o-rings disposed in recesses in the exterior surface of the bearing housing 12, with one o-ring disposed on each side of the cavity 34. Fluid may then pass through fluid passageway 42 in the bearing housing 12 into the second fluid cavity 44. The tilt pad thrust retainer 16 may include means for sealing 52 the second fluid cavity 44. In the illustrated embodiment, the means for sealing 52 the second fluid cavity 44 is an o-ring disposed in a recess in the exterior surface of the tilt pad thrust retainer 16.

Figure 4A:
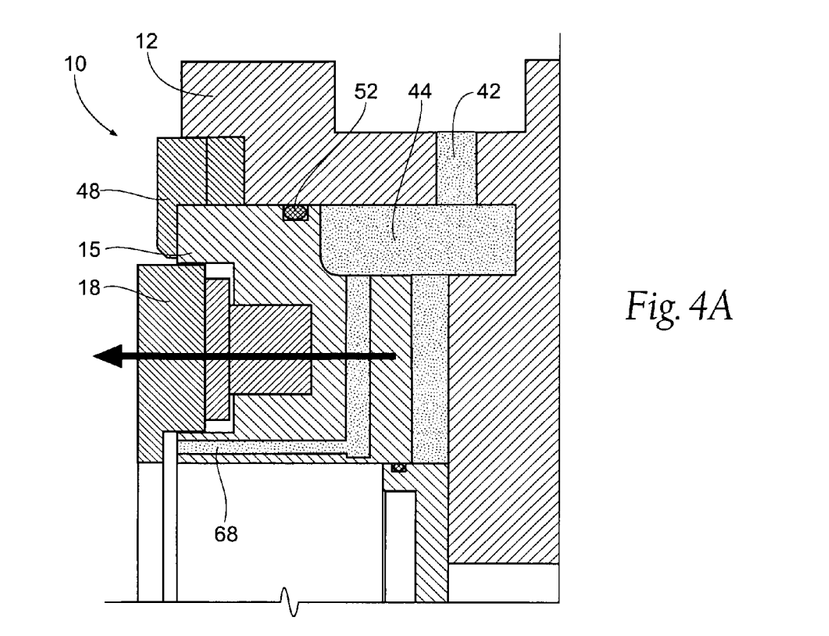
FIGS. 4A and 4B are partial sectional views of a portion of the bearing system of FIG. 1 in its extended and retracted positions, respectively.
Figure 4B:
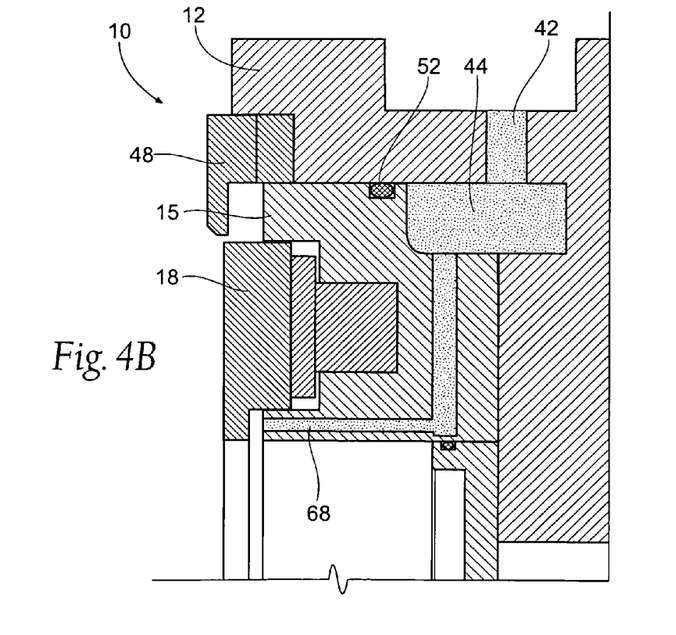

As fluid enters the second fluid cavity 44, pressure is built up in the second fluid cavity 44, which causes the tilt pad thrust retainer 16 to move to its extended position. As shown in FIGS. 4A and 4B, the bearing 14 moves outwardly relative to the bearing housing 12. By moving the tilt pad thrust retainer 16 to its extended position, any axial end clearance is reduced or eliminated.

Figure 11:
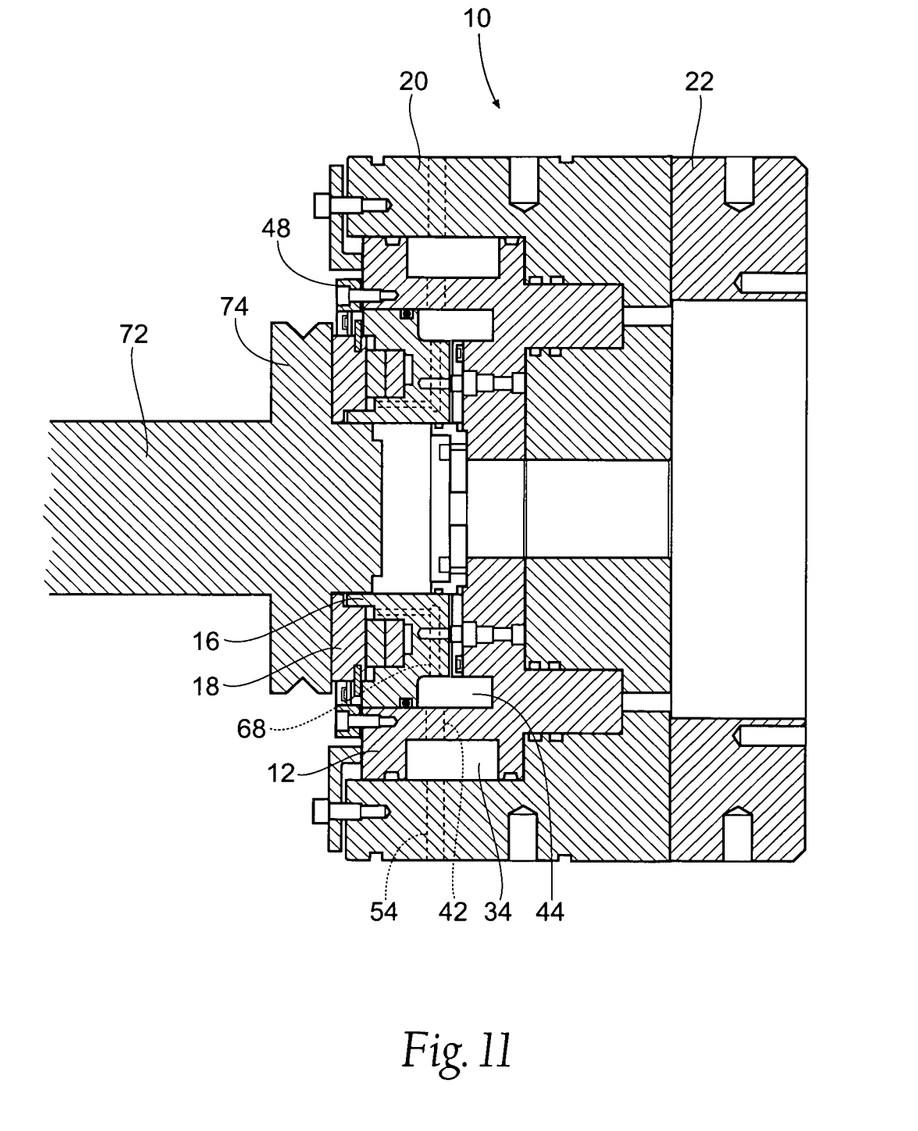
FIG. 11 is a cross sectional view of the bearing system of FIG. 1 in use with a shaft and thrust collar.

As shown in FIG. 11, the bearing system 10 is preferably utilized with a rotating shaft 72 having a thrust collar 74. In use, the bearing 14 is moved to its extended position (see FIG. 4A) by the hydraulic force applied by the system. When the bearing 14 is in its extended position, the bearing surface 18 preferably engages the thrust collar 14. When the shaft system is in use, if the load on the thrust collar 74 exceeds the hydraulic force applied by the bearing system 10, the bearing 14 will be forced back to its retracted position (see FIG. 4B) by the thrust collar 74.

It is contemplated that, if desired, the bearing 14 may include at least one lubricating fluid passageway 68. The lubricating fluid passageway 68 is preferably in fluid communication with the fluid cavity 44 and may provide fluid to lubricate the bearing face 18. In the manner lubrication of the bearing 10 and movement of the bearing 10 may be achieved using the same supply fluid.

Although the illustrated embodiment shows a bearing system 10 utilizing a bearing housing 12 used in conjunction with a outer housing 20 and outer housing spacer 22, it is contemplated that the bearing housing 12 could be used by itself. It is further contemplated that the configuration of the bearing housing 12 could be changed if the bearing housing 12 is to be used without a outer housing 20 and/or outer housing spacer 22. In such an embodiment the fluid would be supplied directly to the bearing housing fluid passageway 42 to feed the fluid cavity 44.

Figure 5:
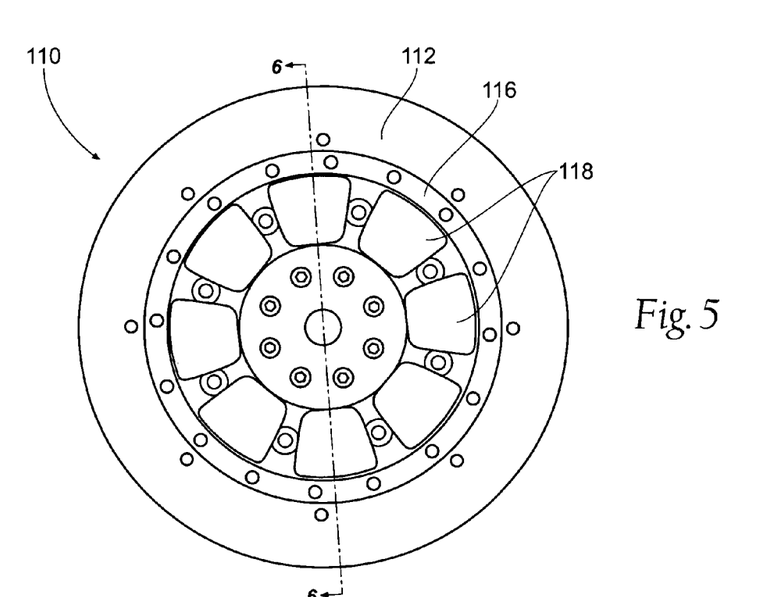
FIG. 5 is a front plan view of an alternative embodiment of a bearing system according to the present invention.
Figure 6:
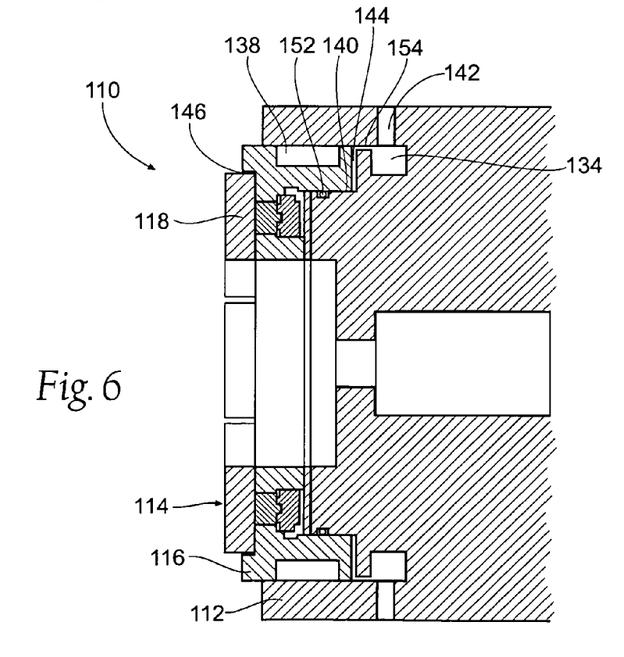
FIG. 6 is a sectional view taken along line 6-6 of FIG. 5.

An alternative embodiment of a bearing system 110 is shown in FIGS. 5 and 6. The bearing system 110 preferably includes a bearing housing 112 and a bearing 114, the bearing 114 including a tilt pad thrust retainer 116, and at least one tilt pad thrust pad 118.

The bearing housing 112 preferably includes a generally cylindrical cavity 138. Preferably, the bearing housing 112 includes an annular recess 140 formed on an inner surface of the cylindrical cavity 138. The bearing housing 112 preferably includes at least one fluid cavity 134 as shown in FIG. 6. As seen in FIG. 6, the bearing housing 112 preferably includes at least one fluid passageway 142 therethrough. The at least one fluid passageway 142 is sized and configured to allow fluid to pass therethrough and is adapted to provide fluid to the fluid cavity 134.

The bearing 114 is preferably sized and configured to be seated at least partially within the bearing housing cavity 138. The bearing 114 preferably includes a tilt pad thrust retainer 116 and at least one tilt pad thrust pad 118. As shown in FIG. 6, a second fluid cavity 144 is defined between the exterior surface of the tilt pad thrust retainer 116 and the interior surfaces of the bearing housing 112. The first fluid cavity 134 is preferably in fluid communication with the second fluid cavity 144.

The tilt pad thrust retainer 116 carries the tilt pad thrust pads 118. The tilt pad thrust retainer 116 preferably includes an annular recess 146. The tilt pad thrust pads 118 preferably sit at least partially within the annular recess 146. If desired, the bearing system 110 may include an axial bearing retainer (not shown). The axial bearing retainer may take any form known in the art including, but not limited to, a retaining ring, shoulder screws or tabs. It is also contemplated that the bearing system 110 could be provided with no axial bearing retainer as shown in the illustrated embodiment.

As seen in FIG. 6, the bearing housing 112 preferably includes at least one fluid passageway 142. Fluid passes through the passageway 142 and into the first fluid cavity 132. The bearing housing 112 may include means for sealing 152 the first fluid cavity 134. Fluid then passes through at least one second fluid passageway 154 formed through the bearing housing 112 into the second fluid cavity 144. As previously described with respect to FIGS. 4A and 4B, as fluid enters the second fluid cavity 144, pressure is built up in the second fluid cavity 144, which causes the bearing 114 to move to its extended position. The bearing 114 moves relative to the bearing housing 112. By moving the bearing 114 to its extended position, any axial end clearance is reduced.

As shown in FIG. 6, the lubricating fluid cavity 138 does not need to be in direct communication with the housing cavity 134. Separate oil supplies and, consequentially, separate pressures can be provided to each cavity 138 and 134. This embodiment allows additional control of the hydraulic force used to reduce axial end clearance and reduce or eliminate vibrations. Although not shown, cavities 138 and 134 may be sealed from each other by o-ring or other means.

Figure 7:
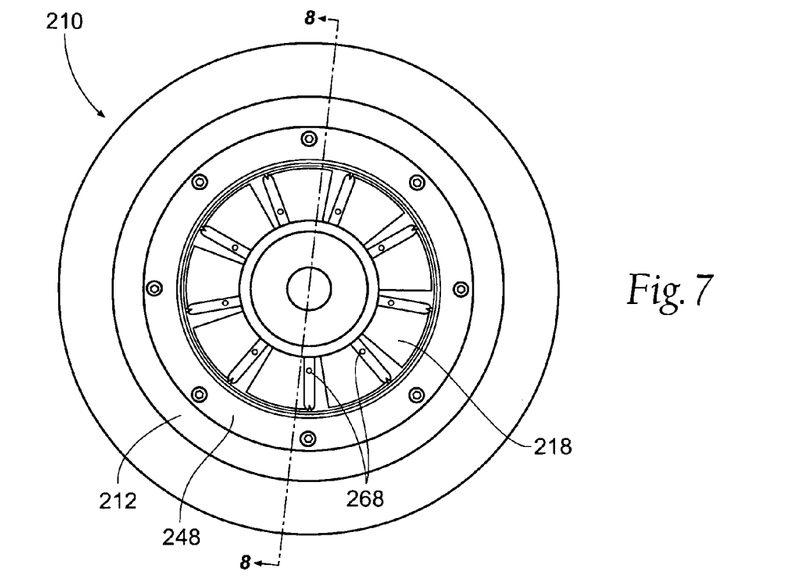
FIG. 7 is a front plan view of an additional alternative embodiment of a bearing system according to the present invention.
Figure 8:
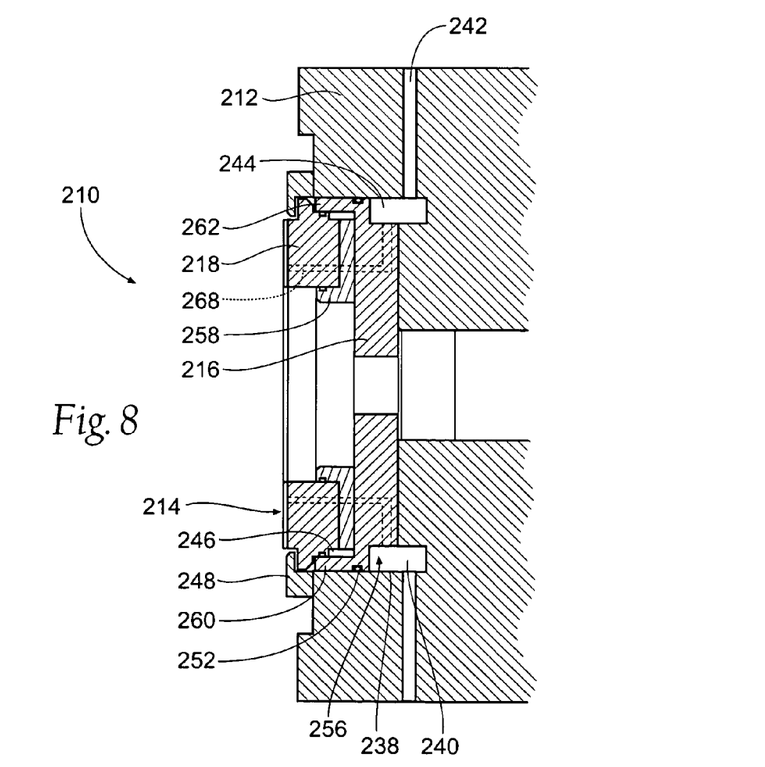
FIG. 8 is a sectional view taken along line 8-8 of FIG. 7.

FIGS. 7 and 8 show an illustrated embodiment of a hydraulically adjusted bearing system 210. The bearing system 210 may include a bearing housing 212, and a bearing 214. The bearing 214 may take any form known in the art. In the illustrated embodiment the bearing 214 takes the form of a taper land thrust bearing. The bearing 214 preferably includes a thrust plate retainer 216 and a thrust plate 218.

The bearing housing 212 preferably includes a generally cylindrical cavity 238. Preferably, the bearing housing 212 includes an annular recess 240 formed on an inner surface of the cylindrical cavity 238. The bearing housing 212 preferably includes at least one fluid passageway therethrough 242. The at least one passageway 242 is sized and configured to allow fluid to pass therethrough and is adapted to feed fluid to the fluid cavity 244, as will be described in more detail below. If desired, the bearing housing 212 or thrust face retainer 216 may include means for sealing 252 the fluid cavity 244.

The bearing 214 is preferably sized and configured to be seated at least partially within the bearing housing cavity 238. As shown in FIG. 8, a fluid cavity 244 is defined between the exterior surface of the thrust plate retainer 216 and the interior surfaces of the bearing housing 212. Optionally, as shown in FIG. 8, at least a portion 256 of the thrust plate retainer 216 has a reduced exterior diameter. The thrust plate retainer 216 preferable includes an annular projection 260 extending from the front surface of the thrust plate retainer 216 at the outer diameter of the thrust plate retainer 216. This forms a cavity 246 in which the bearing face 218 may be seated.

If desired, the bearing system 210 may further include a thrust plate shim plate 258 as shown in FIG. 8. The shim plate 258 is preferably sized and configured to be seated, at least partially within the cavity 246 formed by the thrust plate retainer projection 260. The shim plate 258 preferably includes an annular projection 262 extending from the front surface of the shim plate 258 at the inner diameter of the shim plate 258. The bearing system 210 may further include a thrust face plate 218. The thrust face plate 218 is preferably sized and configured to be seated at least partially on the shim plate 218.

As shown in FIG. 8, at least one fluid passageway 242 extends through the bearing housing 212 to the fluid cavity 244. Fluid passes into the least one fluid passageway 242 through the bearing housing 212 into the fluid cavity 244. As previously described with respect to FIGS. 4A and 4B, as fluid enters the fluid cavity 244, pressure is built up in the fluid cavity 244, which causes the bearing 214 to move to its extended position. The bearing 214 moves relative to the bearing housing 212. By moving the bearing 214 to its extended position, any axial end clearance is reduced or eliminated.

It is contemplated that, if desired, the bearing 214 may include at least one lubricating fluid passageway 268. The lubricating fluid passageway 268 is preferably in fluid communication with the fluid cavity 244 and may provide fluid to lubricate the bearing face 218. In the manner lubrication of the bearing 210 and movement of the bearing 210 may be achieved using the same supply fluid.

Figure 9:
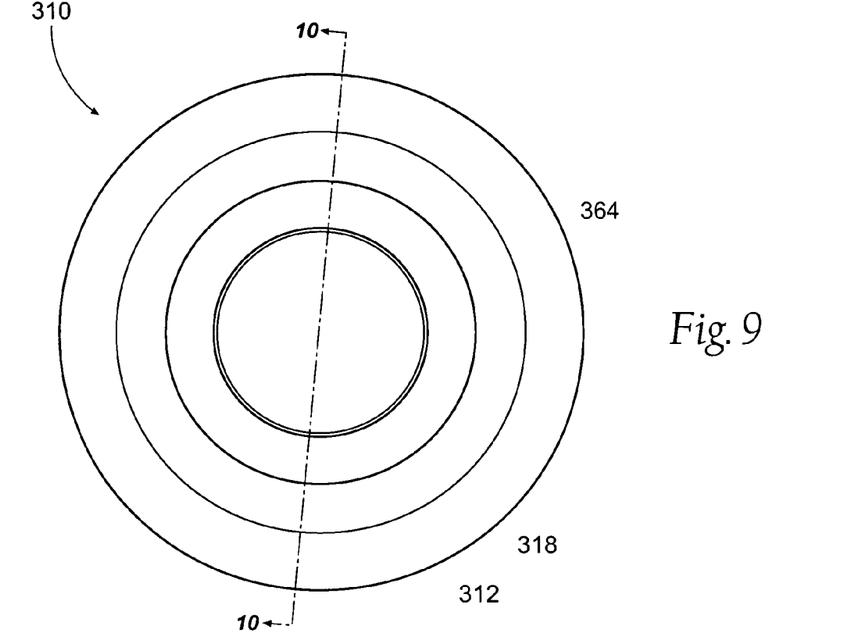
FIG. 9 is a front plan view of an additional alternative embodiment of a bearing system according to the present invention.
Figure 10:
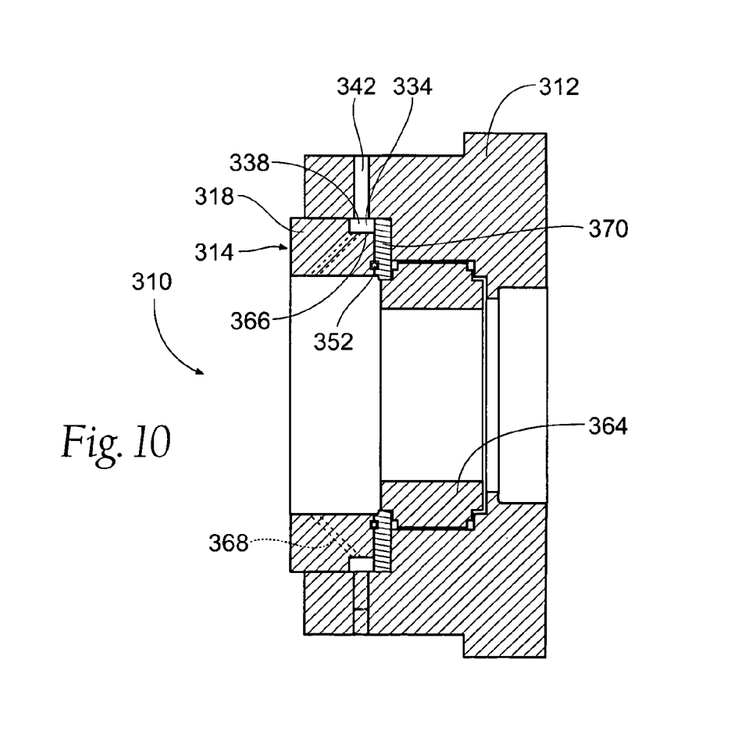
FIG. 10 is a sectional view taken along line 10-10 of FIG. 9.

FIGS. 9 and 10 show alternative embodiment of a hydraulically adjusted bearing system 310. It should be noted that although the illustrated embodiment of FIGS. 9 and 10 include journal bearings 364, it is contemplated that these journal bearings 364 may be excluded if desired. The bearing system 310 preferably includes a bearing housing 312 and a bearing 314. In this embodiment, the bearing comprises a taper land thrust bearing 318 or may be of any other type of thrust bearing.

The bearing housing 312 preferably includes a generally cylindrical cavity 338. Preferably, the thrust plate 318 sits at least partially within the bearing housing cylindrical cavity 338. In the illustrated embodiment a generally annular end plate 370 is located between the interior end wall of the bearing housing 312 cavity and the thrust plate 318. If desired, the end plate 370 may be fixed to the bearing housing 312 by at least one fixation member, such as, but not limited to a screw. This end plate 370 is sized and configured to retain the journal bearing 364 in place. However, it should be understood that if the bearing system 310 did not include journal bearing 364, the end plate 370 would not be required. It is further contemplated that the end plate 370 may be integral to the housing 312.

As seen in FIG. 10, at least a portion 366 of the thrust plate 318 has a reduced outer diameter. When the thrust plate 318 is placed in the bearing housing cavity 338, a fluid cavity 344 is defined between the interior wall of the bearing housing 312 and the reduced diameter area 366 of the thrust plate 316. The bearing housing 312 preferably includes at least one fluid passageway 342 extending therethrough. The fluid passageway 342 is preferably sized and configured to feed fluid to the fluid cavity 344. If desired, the bearing housing 312 or bearing 314 may include means for sealing 352 the fluid cavity 344. If desired, the thrust plate 318 may include at least one lubricating fluid passageway 368 extending therethrough. The lubricating fluid passageway 368 is preferably in fluid communication with the cavity 344.

In this manner, fluid provided to the bearing system 310 enters the fluid cavity 344 through the bearing housing fluid passageway 342. As previously described with respect to FIGS. 4A and 4B, as fluid enters the fluid cavity 344, pressure is built up in the fluid cavity 344, which causes the bearing 314 to move to its extended position. The bearing 314 moves relative to the bearing housing 312. By moving the bearing 314 to its extended position, any axial end clearance is reduced or eliminated. If desired, fluid may be provided to the thrust bearing face 318 through the bearing plate fluid passageways 368.

It is contemplated that, if desired, the bearing 314 may include at least one lubricating fluid passageway 368. The lubricating fluid passageway 368 is preferably in fluid communication with the fluid cavity 344 and may provide fluid to lubricate the bearing face 318. In the manner lubrication of the bearing 310 and movement of the bearing 310 may be achieved using the same supply fluid.

It is contemplated that any of the illustrated embodiments 10,110,210,310 shown above may include at least one sealing element 52,152,252,352 to seal the cavity formed between the bearing housing 12,112,212,312 and the bearing 14,114, 214,314 itself. The sealing element 52,152,251,352 may take any form known in the art including, but not limited to, an o-ring.

It is further contemplated that any type of thrust bearing surface 18,118,218,318 may be utilized in connection with any of the bearing housings 12,112,212,312 shown in any of the illustrated embodiments.

It is further contemplated that any of the illustrated embodiments of bearing systems 10,110,210,310 shown above may include any type of bearing retainer 48 or may include no bearing retainer.

It is further contemplated that any of the illustrated embodiments of bearing systems 10,110,210,310 shown above may be utilized in connection with a outer housing and/or spacer as shown in the illustrated embodiment of FIGS. 1 and 2 or may include no outer housing an/or outer housing spacer.

It is further contemplated that any fluid may be utilized to activate the bearing system. These fluids include, but are not limited to water, oil, and air.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

We claim:

1. A thrust bearing system comprising
   a bearing housing, said bearing housing having a generally cylindrical sidewall;
   the housing having an annular recess formed at an inner surface of the cylindrical sidewall;
   a bearing, the bearing being at least partially disposed within the bearing housing, the bearing being movable between a first retracted position and a second extended position;
   said bearing having a bearing flange formed at an outer perimeter of the bearing;
   an annular fluid cavity formed between the annular recess in the bearing housing and the bearing flange of the bearing; and
   at least one fluid passageway extending through the sidewall of the bearing housing, the fluid passageway having a first end at an exterior surface of the bearing housing sidewall and a second end in fluid communication with the fluid cavity.

2. The thrust bearing system of claim 1 wherein the bearing further includes at least one bearing surface.

3. The thrust bearing system of claim 2 wherein the bearing surface is a flat thrust face.

4. The thrust bearing system of claim 2 wherein the bearing surface is a taper land thrust bearing.

5. The thrust bearing system of claim 2 wherein the bearing surface has at least one tilt pad thrust face.

6. The thrust bearing system of claim 5 further comprising at least one bearing retainer coupled to the bearing housing and surrounding the bearing, the bearing retainer being sized and configured to limit the motion of the bearing relative to the bearing housing.

7. The thrust bearing system of claim 2 further comprising at least one bearing fluid passageway extending through the bearing, the bearing fluid passageway having a first end at the fluid cavity and a second end near the bearing surface.

8. The thrust bearing system of claim 1 further comprising at least one sealing element disposed between the bearing and the bearing housing.

9. The thrust bearing system of claim 8 wherein the at least one sealing element is an o-ring.

10. A method of reducing end clearance in a bearing system comprising:

providing a bearing housing, said bearing housing having a generally cylindrical sidewall, said sidewall having an interior surface and an exterior surface, said bearing housing having an annular recess formed at said interior surface, said bearing housing including at least one fluid passageway extending through said sidewall of said bearing housing;

providing a bearing, said bearing being sized and configured to sit at least partially within the bearing housing, said bearing having a bearing flange formed at an outer perimeter of the bearing; a fluid cavity being formed between the bearing flange of the bearing and the annular recess of the bearing housing, the fluid cavity being in fluid communication with the fluid passageway;

introducing fluid to the fluid cavity to cause an increase the pressure in the bearing cavity, thereby acting on the bearing flange and moving the bearing away from the bearing housing.

11. The method of claim 10 wherein the fluid passageway has a first end at said exterior surface of said sidewall of said bearing housing and a second end at said interior surface of said bearing housing sidewall adjacent said fluid cavity.

12. The method of claim 11 wherein said moving step further comprises supplying oil to the first end of the fluid passageway.

13. The method of claim 12 further comprising lubricating the bearing.

14. The method of claim 13 wherein the lubricating step further comprises providing at least one lubrication passageway within the bearing, the lubrication passageway being in fluid communication with the fluid cavity.

15. The method of step 14 wherein the lubrication passageway has a first end at the fluid cavity and a second end at a bearing surface.

\* \* \* \* \*

UNITED STATES PATENT AND TRADEMARK OFFICE
CERTIFICATE OF CORRECTION

PATENT NO. : 8,419,284 B2  Page 1 of 1
APPLICATION NO. : 12/455333
DATED : April 16, 2013
INVENTOR(S) : Barry J. Blair and Donald S. Pitsch It is certified that error appears in the above-identified patent and that said Letters Patent is hereby corrected as shown below:

In the Claims:

Column 10, claim 10, line 8, after "cause an increase" insert -- of --

Signed and Sealed this
Second Day of July, 2013

Teresa Stanek Rea
*Acting Director of the United States Patent and Trademark Office*